United States Patent [19]

Kennan et al.

[11] Patent Number: 5,516,832
[45] Date of Patent: May 14, 1996

[54] CURABLE SILICONE RUBBER COMPOSITION

[75] Inventors: Linda D. Kennan; Thomas M. Gentle; Dale E. Hauenstein, all of Midland; Paul J. Popa, Auburn, all of Mich.

[73] Assignee: Dow Corning Corporation, Midland, Mich.

[21] Appl. No.: 334,171

[22] Filed: Nov. 3, 1994

[51] Int. Cl.$^6$ .............................. C08J 5/10; C08K 3/34; C08L 83/08

[52] U.S. Cl. .................... 524/493; 524/492; 524/494; 524/506; 524/588; 524/497; 525/106; 525/100; 525/103; 525/476; 525/477; 525/478; 525/479

[58] Field of Search .................................... 524/588, 492, 524/493, 494, 506, 497; 525/100, 103, 106, 476, 477, 478, 479

[56] References Cited

U.S. PATENT DOCUMENTS

| | | | |
|---|---|---|---|
| 2,356,367 | 8/1944 | Wright | 252/29 |
| 2,375,007 | 5/1945 | Larsen | 252/48 |
| 2,398,187 | 4/1946 | McGregor | 252/78 |
| 2,466,642 | 4/1949 | Larsen | 252/29 |
| 2,773,034 | 12/1956 | Bartleson | 252/32.7 |
| 3,100,808 | 8/1963 | Dyer | 260/683.9 |
| 3,328,482 | 6/1967 | Northrup | 260/825 |
| 3,697,440 | 10/1972 | Lichtman | 252/321 |
| 3,816,313 | 6/1974 | Szieleit | 252/49.6 |
| 3,959,175 | 5/1976 | Smith, Jr. | 252/321 |
| 4,514,319 | 4/1985 | Kulkarni | 252/321 |
| 4,824,891 | 4/1989 | Laurent et al. | 524/264 |
| 5,008,305 | 4/1991 | Kennan et al. | 523/212 |
| 5,334,646 | 8/1994 | Chen | 524/474 |

FOREIGN PATENT DOCUMENTS

| | | |
|---|---|---|
| 529161 | 8/1981 | European Pat. Off. . |
| 1490240 | 12/1973 | Germany . |
| 63-199277 | 2/1987 | Japan . |

OTHER PUBLICATIONS

Polymer Blends, by Sonja Krause, vol. 1 (1978) p. 86 The Miscibility of Polymers: I. Phase Equilibria in Systems Containing Two Polymers and a Mutual Solvent, by Allen, Gee & Nicholson (1959), pp. 56–62.

The Miscibility of Polymers: II. Miscibility and Heat of Mixing of Liquid Polyisobutenes and Silicones, by Allen, Gee and Nicohson, (1960) pp. 8–17.

Synthetic Lubricants and High–Performance Functional Fluids, Marcel Dekker, Inc., (1993) p. 279.

The Panalane Advantage, Amoco, (1992) pp. 2–8 Macromolecules, vol. 8, No. 3, May–Jun. 1975, pp. 371–373.

Primary Examiner—Paul R. Michl
Assistant Examiner—U. K. Rajguru
Attorney, Agent, or Firm—Alexander Weitz

[57] ABSTRACT

The present invention relates to a peroxide-curable silicone rubber composition which, when cured, exhibits a reduced modulus and improved tear strength relative to prior art systems without sacrificing other desirable properties, such as high tensile strength of the cured rubber or storage stability of the uncured rubber base, said composition comprising:

(A) 100 parts by weight of a diorganopolysiloxane gum;
(B) 10 to 75 parts by weight a reinforcing filler;
(C) a polybutylene oligomer having a number average molecular weight of 200 to less than 900 and having functionality selected from the group consisting of epoxy, alkoxyphenylene, hydroxyl, carboxyl, anhydride and fully saturated; and, optionally,
(D) a hydroxy-terminated diorganopolysiloxane having a degree of polymerization of 2 to 50.

19 Claims, No Drawings

CURABLE SILICONE RUBBER COMPOSITION

FIELD OF THE INVENTION

The present invention relates to a curable silicone rubber composition. More particularly, the invention relates to a composition which can be cured with the aid of an organic peroxide, said composition containing a silicone gum, reinforcing filler and a plasticizer, wherein the plasticizer is a polybutylene oligomer or is a combination of a short-chain, hydroxy-terminated silicone oil and the polybutylene oligomer.

BACKGROUND OF THE INVENTION

Silicone rubber compositions which can be cured with the aid of an organic peroxide catalyst are known in the art. Such a curable composition, which is also called a rubber "base" by those skilled in this art, generally comprises a high viscosity silicone gum (which preferably has some vinyl functionality in its molecule), a reinforcing filler such as fumed silica and a "plasticizer."

A reinforcing filler is needed to bolster the mechanical properties of the inherently weak gum. High filler content (e.g., 10 to 75 parts by weight per 100 parts of the gum) is often required to achieve satisfactory mechanical properties in the final rubber, but there is an untoward consequence of its addition: the rubber base tends to become hard and brittle after even relatively short storage at ambient conditions. This phenomenon, known variously in the art as crepe hardening, crepe aging or structure formation, makes further processing of the rubber base (e.g., compounding, molding, extrusion) impractical or, at best, difficult. Crepe hardening must therefore be kept to a minimum. In order to attain this end, a plasticizer such as a hydroxy-terminated short chain siloxane is typically incorporated in the formulation and its addition allows the rubber base to maintain a relatively fluid condition for subsequent processing. An organic peroxide is then thoroughly dispersed in the rubber base to provide a rubber "stock" which, in turn, can be fabricated into a desired shape and cured at elevated temperature to a finished silicone rubber part. Although the above described silicone rubber compositions exhibit relatively high tensile strength, the amount of reinforcing filler needed for this purpose also tends to impart a high modulus to the cured rubber. This is undesirable in many applications, such as gaskets, O-rings, connectors, wire and cable, as well as various extruded and molded parts where flexibility is a key requirement. Moreover, even with high filler loadings, cured silicone rubbers are notorious for their poor tear strength relative to cured organic rubbers. These limitations further restrict the arena of application for the silicone rubbers and represent unmet needs in the commercial exploitation thereof.

SUMMARY OF THE INVENTION

The present inventors have now discovered that a plasticizer consisting essentially of a certain polybutylene (PB) oligomer, or a combination of a hydroxy-terminated, short-chain diorganopolysiloxane and the polybutylene oligomer, can be employed in a conventional silicone rubber base or stock to reduce modulus and improve tear strength of the cured rubber. Moreover, these improvements are attained without sacrificing other desirable properties, such as high tensile strength of the cured rubber or storage stability of the rubber base (as measured by increase in plasticity after aging).

As generally prepared in commercial production, PB oligomers have one of the following unsaturated structures

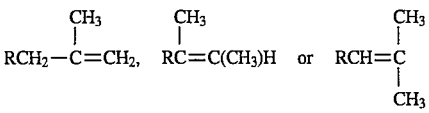

in which R is an oligomeric PB chain. It has been found that, unlike the PB oligomers of the present invention, the use of such unsaturated compounds as a plasticizer does not result in cured silicone rubbers having high tear strength and low modulus.

The present invention therefore relates to a curable silicone composition comprising:
(A) 100 parts by weight of a diorganopolysiloxane gum;
(B) 10 to 75 parts by weight of a reinforcing filler; and
(C) a polybutylene oligomer having terminal groups selected from epoxy, alkoxyphenylene, hydroxyl, carboxyl, anhydride or fully saturated, said polybutylene oligomer having a number average molecular weight of 200 to less than 900; and, optionally,
(D) a hydroxy-terminated diorganopolysiloxane having a degree of polymerization of 2 to 50.

The invention also relates to the above silicone rubber base composition which further comprises an organic peroxide catalyst.

The invention further relates to a cured rubber article which results when the catalyzed composition is heated and cured.

DETAILED DESCRIPTION OF THE INVENTION

The diorganopolysiloxane (A) of the present invention is a high consistency gum having a degree of polymerization of about 2,000 to about 25,000, preferably 2,000 to 8,500. Component (A) may be a linear or branched polymer or copolymer wherein the organic groups are independently selected from hydrocarbon and halogenated hydrocarbon radicals having 1 to 6 carbon atoms, such as alkyl radicals having 1 to 6 carbon atoms, alkenyl radicals having 2 to 6 carbon atoms, aryl radicals such as phenyl, halogenated alkyl radicals having 3 to 6 carbon atoms, aralkyl radicals or cycloaliphatic radicals having 5–6 carbon atoms. In order to facilitate the crosslinking of the instant compositions by an organic peroxide catalyst, described infra, it is preferred that the gum contain up to about 5 mole percent alkenyl radicals, such as vinyl radicals, either along the chain or at the chain ends. Most preferably, up to about 2 mole percent vinyl radicals are present in each gum molecule. Aside from this consideration, the nature of the terminal groups on the diorganopolysiloxane gum is not critical for the purposes of the present invention. They may be illustrated by such groups as trimethylsiloxy, dimethylphenylsiloxy, diethylphenylsiloxy, dimethylvinylsiloxy, dimethylhexenylsiloxy and dimethylhydroxysiloxy, dimethylvinylsiloxy being preferred.

Examples of suitable diorganopolysiloxanes include polydimethylsiloxane homopolymers, polymethylhexylsiloxane homopolymers, copolymers of dimethylsiloxane units and methylphenylsiloxane units, homopolymers of methyl-3,3,3-trifluoropropylsiloxane units, copolymers of dimethylsiloxane units and methylhexylsiloxane units, copolymers of dimethylsiloxane units and methylchloropropylsiloxane units, copolymers of dimethylsiloxane units and methyl-beta-phenylethyl-siloxane units, copolymers of dimethylsiloxane units and methylcyclohexylsiloxane units and copolymers of dimethylsiloxane units and methylhydrogensiloxane units, inter alia. Again, it is preferred that up to about 5 mole percent of alkenyl-containing siloxane units are inter-polymerized within the above mentioned polymer or copolymer systems. Mixtures of two or more such gums may be employed as component (A).

A preferred diorganopolysiloxane is polydimethylsiloxane wherein up to about 30 mole percent, more preferably up to 8 mole percent, of the above mentioned diorganosiloxane units may be copolymerized with the dimethylsiloxane units. Most preferably, component (A) is a linear polydimethylsiloxane homopolymer or linear copolymer of dimethylsiloxane units with up to about 5 mole percent methylvinylsiloxane units, the polymer or copolymer having either trimethylsiloxy or dimethyvinylsiloxy terminal units.

Component (A) is well known in the art and many such polymers and copolymers are available commercially.

The reinforcing filler (B) is selected from finely divided, heat stable minerals such as the fumed and precipitated forms of silica, silica aerogels and titanium dioxide, and has a specific surface area of at least about 50 m$^2$/gram. The fumed form of silica is a preferred reinforcing filler based on its high surface area, which can be up to 450 m$^2$/gram. Preferably, this component is a fumed silica having a surface area of 50 to 400 m$^2$/g, most preferably 200 to 380 m$^2$/g. Filler (B) may also be a treated filler wherein the surface has been rendered hydrophobic by pre-treatment with, e.g., hexamethyldisilazane, dimethyldichlorosilane, polydimethylsiloxane or alkoxysilanes.

The polybutylene (C) of the present invention is an oligomer or polymer having a number average molecular weight (MW) of about 200 to less than 900, preferably about 250 to about 600 and most preferably about 300 to about 400. When the MW is about 900 or greater, there is a marked deterioration of tear strength of the cured silicone rubber even though modulus is reduced relative to a silicone plasticizer system.

Component (C) is derived from a polybutylene having the structure $$R_2C=CR_2 \qquad (i)$$

wherein each R is independently selected from hydrogen or an alkyl group, with the proviso that at least one R group is an oligomeric polybutylene chain which can comprise units having the following structures

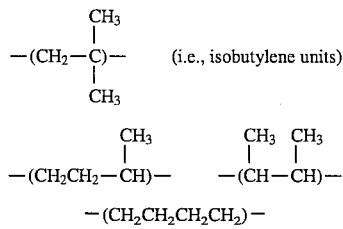

$$-(CH_2CH_2CH_2CH_2)-$$

Generally, only one R group is an oligomeric chain such that the unsaturated group resides at one end of the molecule and the preferred PB is an oligomer consisting essentially of polyisobutylene units. For the purposes of the present invention, the unsaturated polybutylene (i) is reacted by methods well known in the art to provide an oligomer or polymer having epoxy, alkoxyphenylene, hydroxyl, carboxyl, anhydride or fully saturated functionality such that the PB oligomer contains essentially no residual unsaturation.

In one preferred embodiment, the PB oligomer or polymer is prepared by epoxidation of (i) to form an epoxy-functional component (C) of the structure

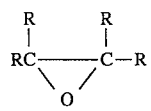 (ii)

in which R has its previously defined meaning. Such oligomers are known in the art and many are available commercially in a variety of molecular weights from the Amoco Chemical Company (Chicago, Ill.) under the trade name Actipol™. It is believed that the epoxy functionality of the Actipol™ resides predominantly at one end of the oligomer while the other end has the structure —C(CH$_3$)$_3$.

In another preferred embodiment, the PB oligomer is prepared by hydrogenating (i) to form a fully saturated oligomer or polymer (C) of the formula

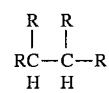 (iii)

in which R has its previously defined meaning. These PB oligomers are also known and available commercially from the Amoco Chemical Company, Chicago, Ill. under the trade name Panalane™ as well as from Polyesther Corporation, Southhampton, N.Y. under the trade name Polysynlane™. It is believed that a group of the formula

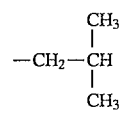 (iv)

resides predominantly at one chain end of these commercial oligomers while the other end has the structure —C(CH$_3$)$_3$.

In preferred embodiments of the present invention, the curable silicone composition also contains a hydroxy-terminated diorganopolysiloxane (D). Component (D) is a hydroxy-terminated diorganopolysiloxane, oligomer polymer or copolymer comprising -(R$^1$R$^2$SiO)-siloxane unit, wherein R$^1$ represents identical or different groups selected from hydrogen or a monovalent substituted or unsubstituted hydrocarbon radicals, as described in connection with component (A), supra. R$^2$ is selected from monovalent substituted or unsubstituted hydrocarbon radicals, as described in connection with component (A), supra, and n is 2 to about 50. This component can be branched or linear and is preferably represented by the general formula $$HO(R^1R^2SiO)_nOH$$

in which R$^1$, R$^2$ and n have their previously defined meanings. Preferred R$^1$ and R$^2$ groups are methyl and phenyl. It is preferred that this component is a polydimethylsiloxane homopolymer wherein n is 2 to about 50, more preferably 3 to about 20, most preferably 3 to about 15. It is also contemplated herein that mixtures of such hydroxy-terminated diorganopolysiloxanes may be used. These oligomeric siloxanes are well known in the art and further description thereof is considered unnecessary.

In order to prepare a silicone rubber base according to the invention, 100 parts by weight of diorganopolysiloxane (A), from about 10 to about 75 parts by weight of reinforcing filler (B) and about 0.02 to about 0.5 parts by weight of polybutylene oligomer (C) for each one part by weight of said filler (B) are thoroughly mixed. In such a composition, the PB acts as a plasticizer which prevents crepe hardening.

Preferably, the plasticizer is a combination of hydroxy-terminated diorganopolysiloxane (D) and polybutylene (C), the weight ratio of component (D) to component (C) being in the range of about 1:5 to about 5:1. Preferably, the weight ratio of diorganopolysiloxane (D) to PB oligomer (C) is about 3:1 to 1:3, more preferably about 1:1 to 1:3 and most preferably about 1:1. When the plasticizer contains both (C) and (D), from about 0.02 to about 0.5 parts of the total weight of the polybutylene (C) and diorganopolysiloxane (D) is used for each weight part of filler (B). When component (B) is a non-treated, fumed silica filler, it is preferred that about 0.1 to about 0.4 parts by weight of (C) plus (D) is used for each part by weight of filler (B).

When mixing the above described components, any conventional mixer, such as a two-roll mill, Banbury mixer, sigma-blade mixer, dough mixer or twin-screw extruder, may be used. In a typical procedure, the gum is introduced to the mixer and the filler added incrementally. The plasticizer components (C) and (D) may be mixed into the gum or added concurrently with the filler. Alternatively, the filler may be blended with the plasticizer components by tumbling the combination to coat the filler therewith; this blend can then be added to the gum in the mixer and blended to homogeneity. In each case, components (C) and (D) may be added individually or combined to form the plasticizer of the invention before mixing with the gum and filler.

In addition to the above mentioned components (A) through (D), the instant compositions may further contain various non-essential ingredients, depending on the intended application. Examples of such non-limiting ingredients include non-reinforcing fillers, such as calcium carbonate, ground quartz and aluminum trihydrate; adhesion promoters; cure additives; pigments; stabilizers; dyes; antioxidants; flame retardants; silanes, such as alkoxysilanes; silazanes; and siloxanes. These optional ingredients may be added to the mixer prior to, concurrent with, or subsequent to the addition of the other components.

The above described silicone rubber base can then be mixed with (E) an organic peroxide catalyst using, e.g., a two-roll mill at ambient temperature to form a silicone rubber stock. The optimum amount of the catalyst is best determined by routine experimentation but is at least an amount sufficient to cure the composition. Typically, the catalyst is added at a level of about 0.5 to about 2.5 parts by weight per 100 parts by weight of the total base. Suitable peroxides include benzoyl peroxide, t-butyl peroxy O-toluate, cyclic peroxyketal, t-butyl hydroperoxide, di-t-butyl peroxide, 1,3-bis(t-butylperoxyisopropyl) benzene, 2,2,4-trimethylpentyl-2-hydroperoxide, 2,5-bis(t-butylperoxy)-2,5-dimethylhexane, cumyl hydroperoxide, t-butyl peroxybenzoate, p-chlorobenzoylperoxide, dicumyl peroxide, t-butylperoxyisopropylcarbonate and diisopropylbenzene mono hydroperoxide, inter alia. These may be employed individually or in combinations of two or more. For the purposes of the invention, it is preferred that the peroxide (E) is an aryl peroxide, such as 2,4-dichlorobenzoylperoxide or benzoyl peroxide. The latter two peroxides do not require the presence of alkenyl functionality in the gum to result in efficient cure.

The silicone rubber stock may then be fabricated into a silicone rubber article and cured at elevated temperatures. Any of the conventional methods known in the art may be used to prepare such articles, including extrusion, injection molding, calendaring, transfer molding, compression molding, inter alia. Cure conditions will, of course, depend upon the activity and half life of the particular peroxide employed. Thus, for example, for the case of 2,4-dichlorobenzoylperoxide, the cure is typically carried out at about 116° C. for a period of about 5 to 10 minutes.

Cured articles according to the invention may be utilized in any of the applications currently enjoyed by high consistency silicone rubber formulations. They are particularly useful where excellent tear strength and low modulus are key requirements, as in gaskets, electrical insulation, silicone molds, O-rings, connectors and tubing.

EXAMPLES

The following examples are presented to further illustrate the composition of this invention, but are not to be construed as limiting the invention, which is delineated in the appended claims. All parts and percentages in the examples are on a weight basis and all measurements were obtained at 25° C., unless indicated to the contrary.

EXAMPLES 1–9

Silicone rubber bases were prepared by mixing a gum, silica filler, hydroxy-terminated polydimethylsiloxane oil and a PB oligomer in the proportions shown in Table 1.

The gum employed (labeled "GUM" in Table 1) was a dimethylvinylsiloxy-terminated polydimethylsiloxane gum containing 0.142 mole percent of methylvinylsiloxane units and having a plasticity of about 60 mils (see test conditions, infra)

The filler used was Cab-O-Sil™ MS-75 which is described as a fumed silica having a nominal surface area of about 255 m² per gram (Cabot Corporation, Tuscola, Ill.).

The hydroxy-terminated polydimethylsiloxane (labeled "OIL" in Table 1) was a linear oligomer having a degree of polymerization of about 7.

The PB oligomers in the examples are described as follows: Polysynlane™ is described as a saturated polyisobutylene having a number average molecular weight of about 320 and having one terminal group of the formula

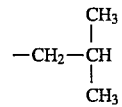

the other terminal group being of the formula —C(CH$_3$)$_3$. It is a product of Polyesther Corporation, Southhampton, N.Y. ActiPol™ E-6 is described as an epoxy-terminated polyisobutylene having a number average molecular weight of about 365 and is a product of the Amoco Chemical Company, Chicago, Ill. This oligomer has one group, which is predominantly terminal, of the structure

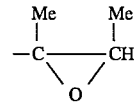

in which Me denotes a methyl radical, the other terminal group being of the formula —C(CH$_3$)$_3$. Actipol™ E-16 is similar to Actipol™ E-6 but has a molecular weight of about 975 (Amoco Chemical Co.). Indopol™ L-14 is described as a predominantly vinyl-terminated polyisobutylene having a number average molecular weight of about 320 and a product of the Amoco Chemical Company, Chicago, Ill. One terminal group of this oligomer has the vinyl-like structure (2-methylpropenyl) —HC=C(CH$_3$)$_2$, the other terminal group having the formula —C(CH$_3$)$_3$.

The rubber base formulations of Table 1 were prepared by charging the gum to a Haake sigma-blade mixer, followed by an incremental addition of the silica filler, polydimethylsiloxane oil and PIB, to prevent crumbling of the base, which was heated for one hour at about 150° C. while mixing continued. Each resulting base was compounded with 1.5 parts of Cadox™ TS-50 per 100 parts of the base formulation to form a rubber stock. Cadox™ TS-50 is described as a 50% paste of 2,4-dichlorobenzoylperoxide and is a product of Akzo (Chicago, Ill.). Each rubber stock was then cured for 10 minutes at 116° C. and the mechanical properties were determined as follows:

Tensile strength, modulus, elongation and energy to break were obtained according to ASTM method D 412. The average of five tests was reported and these values are presented in Table 2.

Durometer (hardness) was obtained using a Shore A durometer and these values are also presented in Table 2.

Tear strength was determined using a die-B in ASTM method D 624, the results again being shown in Table 2.

Plasticity was obtained according to ASTM method D 926 and the final thickness is reported in mils after compressing a 2.2 gram sample for three minutes.

of the polydimethylsiloxane oil was replaced with Polysynlane™ or Actipol™ respectively showed both decreased moduli as well as greatly improved tear strength of the cured rubbers. Furthermore, the use of an epoxy-terminated PIB having a molecular weight greater than 900 (Actipol™ E-16) resulted in cured rubber (Example 8) which had lower modulus, but also exhibited reduced tear strength versus the control of Example 1.

Finally, although not apparent from Table 2, the use of only Polysynlane™ without the hydroxy-terminated polydimethylsiloxane oil (Example 7) resulted in difficult processing of the base even though the cured rubber modulus was reduced and the tear strength augmented over the control of Example 1. Thus, it took an exceptionally long time to obtain a homogeneous mixture (e.g., as much 100% more time to reach maximum mixing torque) when only this component was used as the plasticizer. Such extensive processing times are not desirable in commercial operations.

TABLE 1

| Component | Example Number — Parts by Weight | | | | | | | | |
|---|---|---|---|---|---|---|---|---|---|
| | 1 | 2 | 3 | 4 | 5 | 6 | 7 | 8 | 9 |
| GUM | 100 | 100 | 100 | 100 | 100 | 100 | 100 | 100 | 100 |
| OIL | 10 | 7.5 | 5 | 5 | 5 | 2.5 | — | 5 | 10 |
| Polysynlane™ | — | 2.5 | 5 | — | — | 7.5 | 10 | — | — |
| Actipol™ E6 | — | — | — | 5 | — | — | — | — | 5 |
| Actipol™ E16 | — | — | — | — | — | — | — | 5 | — |
| Indopol™ L14 | — | — | — | — | 5 | — | — | — | — |
| Silica filler | 38 | 38 | 38 | 38 | 38 | 38 | 38 | 38 | 38 |

TABLE 2

| Property | Example Number | | | | | | | | |
|---|---|---|---|---|---|---|---|---|---|
| | 1 | 2 | 3 | 4 | 5 | 6 | 7 | 8 | 9 |
| Durometer A | 57 | 55 | 53 | 43 | 28 | 33 | 35 | 43 | 31 |
| Tensile (psi) | 1333 | 1234 | 1356 | 1328 | 104 | 1549 | 1371 | 1149 | 1118 |
| Elongation (%) | 428 | 478 | 494 | 752 | 104 | 720 | 650 | 362 | 738 |
| Mod @ 50% (psi) | 195 | 167 | 150 | 100 | 93 | 73 | 79 | 96 | 55 |
| Mod @ 100% (psi) | 321 | 271 | 249 | 161 | 103 | 118 | 132 | 191 | 88 |
| Mod @ 200% (psi) | 604 | 495 | 479 | 293 | — | 248 | 277 | 477 | 184 |
| Energy to break (in-lb) | 55 | 58 | 62 | 96 | 2 | 83 | 70 | 46 | 78 |
| Tear (ppi) | 89 | 98 | 154 | 190 | 33 | 136 | 112 | 70 | 136 |

The initial plasticity of each base is reported in Table 3. Additionally, the percent variation of plasticity from the initial reading after storage at room temperature for the indicated times is shown in Table 3.

From Table 2 it can be seen that the total plasticizer (i.e., hydroxy-terminated polydimethylsiloxane oil and PIB) in Examples 1–8 was 10 parts for each 100 parts of the gum (0.26 part of OIL plus PIB per part of silica). The control formulation, which contained only the hydroxy-terminated polydimethylsiloxane oil (Example 1), exhibited a 100% modulus (i.e., the nominal stress at 100% elongation) which was considerably greater than the corresponding moduli of the rubbers of the invention (Examples 2–4, 6 and 9). This control had a tear strength which was inferior to that of the latter compositions. Replacing half of the oil of Example 1 with Indopol™ L-14 dramatically reduced tensile strength, modulus, elongation and durometer of the cured rubber (Example 5). To the contrary, Examples 3 or 4, wherein half

TABLE 3

| Property | Example Number | | | | | | | | |
|---|---|---|---|---|---|---|---|---|---|
| | 1 | 2 | 3 | 4 | 5 | 6 | 7 | 8 | 9 |
| Initial Plasticity (mils) | 88 | 90 | 118 | 111 | 110 | 113 | 130 | 146 | 97 |
| % Change in Plasticity Afer: | | | | | | | | | |
| 1 day | 26 | 30 | 27 | 23 | 25 | 20 | 23 | 22 | 7 |
| 7 days | 51 | 57 | 45 | 49 | 40 | 34 | 25 | 37 | 13 |
| 14 days | 62 | 67 | 52 | 55 | 53 | 38 | 34 | 50 | — |
| 21 days | 71 | 72 | 59 | 76 | 68 | 44 | 34 | 60 | — |

That which is claimed is:
1. A composition comprising:

(A) 100 parts by weight of a diorganopolysiloxane gum;

(B) 10 to 75 parts by weight of a reinforcing filler;

(C) a polybutylene having a number average molecular weight of 200 to less than 900, said polybutylene being selected from the group consisting of
 (i) polybutylene having functionality selected from the group consisting of epoxy, alkoxyphenylene, hydroxyl, carboxyl, and anhydride and
 (ii) fully saturated polybutylene; and (D) a hydroxy-terminated diorganopolysiloxane having a degree of polymerization of 2 to 50, wherein the ratio of said hydroxy-terminated diorganopolysiloxane (D) to said polybutylene (C) is 1:5 to 5:1 and a total of 0.02 to 0.5 part by weight of said components (C) plus (D) is present for each part of said filler (B).

2. The composition according to claim 1, wherein said diorganopolysiloxane (A) is selected from the group consisting of polydimethylsiloxane homopolymers, copolymers of dimethylsiloxane units and methylphenylsiloxane units, copolymers of dimethylsiloxane units and methyl-3,3,3-trifluoropropylsiloxane units and said hydroxy-terminated diorganopolysiloxane (D) is a hydroxy-terminated polydimethylsiloxane.

3. The composition according to claim 1, wherein said diorganopolysiloxane (A) is a linear polydimethylsiloxane in which up to 30 mole percent of other diorganosiloxane units are copolymerized with dimethylsiloxane units and said hydroxy-terminated diorganopolysiloxane (D) is a hydroxy-terminated polydimethylsiloxane.

4. The composition according to claim 1, further comprising a sufficient amount of an organic peroxide catalyst to cure said composition, wherein said diorganopolysiloxane (A) is a linear polydimethylsiloxane copolymer of dimethylsiloxane units with up to about 5 mole percent of methylvinylsiloxane units, said hydroxy-terminated diorganopolysiloxane (D) is a hydroxy-terminated polydimethylsiloxane and said polybutylene (C) is selected from the group consisting of epoxy functional polybutylene and fully saturated polybutylene.

5. The composition according to claim 4, wherein the degree of polymerization of said hydroxy-terminated diorganopolysiloxane (D) is 3 to 15.

6. The composition according to claim 5, wherein the number average molecular weight of said polybutylene (C) is 300 to 400.

7. A composition comprising:

(A) 100 parts by weight of a diorganopolysiloxane gum;

(B) 10 to 75 parts by weight of a reinforcing filler; and (C) 0.02 to 0.5 parts by weight for each part of said filler (B) of a polybutylene having a number average molecular weight of 200 to less than 900, said polybutylene being selected from the group consisting of
 (i) polybutylene having functionality selected from the group consisting of epoxy, alkoxyphenylene, hydroxyl, carboxyl, and anhydride and
 (ii) fully saturated polybutylene.

8. The composition according to claim 7, wherein said diorganopolysiloxane (A) is selected from the group consisting of polydimethylsiloxane homopolymers, copolymers of dimethylsiloxane units and methylphenylsiloxane units, copolymers of dimethylsiloxane units and methyl-3,3,3-trifluoropropylsiloxane units.

9. The composition according to claim 7, wherein said diorganopolysiloxane (A) is a linear polydimethylsiloxane in which up to 30 mole percent of other diorganosiloxane units are copolymerized with dimethylsiloxane units.

10. The composition according to claim 7, further comprising a sufficient amount of an organic peroxide catalyst to cure said composition, wherein said diorganopolysiloxane (A) is a linear polydimethylsiloxane copolymer of dimethylsiloxane units with up to about 5 mole percent of methylvinylsiloxane units and said polybutylene (C) is selected from the group consisting of epoxy functional polybutylene and fully saturated polybutylene.

11. The composition according to claim 9, wherein the number average molecular weight of said polybutylene (C) is 300 to 400.

12. A cured article prepared from the composition of claim 1.

13. A cured article prepared from the composition of claim 2.

14. A cured article prepared from the composition of claim 3.

15. A cured article prepared from the composition of claim 4.

16. A cured article prepared from the composition of claim 5.

17. A cured article prepared from the composition of claim 6.

18. A cured article prepared from the composition of claim 7.

19. A cured article prepared from the composition of claim 10.

* * * * *